US008110401B2

United States Patent
Duerr

(10) Patent No.: US 8,110,401 B2
(45) Date of Patent: Feb. 7, 2012

(54) BLEND DYES AND METHOD OF IDENTIFYING LEAKS

(75) Inventor: John Duerr, Massapequa Park, NY (US)

(73) Assignee: Spectronics Corporation, Westbury, NY (US)

( * ) Notice: Subject to any disclaimer, the term of this patent is extended or adjusted under 35 U.S.C. 154(b) by 1737 days.

(21) Appl. No.: 10/848,396

(22) Filed: May 18, 2004

(65) Prior Publication Data

US 2005/0019934 A1 Jan. 27, 2005

Related U.S. Application Data

(60) Provisional application No. 60/489,050, filed on Jul. 21, 2003.

(51) Int. Cl.
*G01N 33/00* (2006.01)

(52) U.S. Cl. .......... 436/3; 436/164; 422/82.05; 422/83

(58) Field of Classification Search .............. 422/58, 422/61, 82.05, 83; 436/1–3, 164, 165, 166
See application file for complete search history.

(56) References Cited

U.S. PATENT DOCUMENTS

| | | | | |
|---|---|---|---|---|
| 4,326,981 A | * | 4/1982 | Molina | 252/301.19 |
| 4,362,645 A | * | 12/1982 | Hof et al. | 252/408.1 |
| 5,250,708 A | * | 10/1993 | Barry, Jr. | 549/226 |
| RE36,951 E | * | 11/2000 | Cooper et al. | 73/40.7 |
| 6,165,384 A | | 12/2000 | Cooper et al. | |
| 6,327,897 B1 | * | 12/2001 | Scaringe et al. | 73/40.7 |

OTHER PUBLICATIONS

Bright Dyes Products—Web site materials dated Jul. 28, 2003—2 pgs.
Bright Dyes—Technical Data Bulletin—Water Tracing Dye—FLT Yellow/Green Products (dated at least Jul. 28, 2003).
Bright Dyes—Technical Data Bulletin—Water Tracing Wax Products (dated at least Jul. 28, 2003).
Bright Dyes—Technical Data Bulletin—Water Tracing Dye—Standard Blue Products (dated at least Jul. 28, 2003).

* cited by examiner

*Primary Examiner* — Lyle Alexander
(74) *Attorney, Agent, or Firm* — Drinker Biddle & Reath LLP

(57) ABSTRACT

A blended dye for use in a coolant. In one embodiment of the invention, the blended dye includes a first water miscible dye adapted to fluoresce when illuminated with a light. The first dye preferably has a wavelength of about 340 nm to about 420 nm. The blended dye also includes a second water miscible dye adapted to fluoresce when illuminated with a light having a wavelength of about 400 nm to about 460 nm. The second dye has a different composition from the first dye.

13 Claims, No Drawings

BLEND DYES AND METHOD OF IDENTIFYING LEAKS

RELATED APPLICATION

This application is related to and claims priority from U.S. Provisional Patent Application Ser. No. 60/489,050, filed Jul. 21, 2003, which is incorporated herein by reference in its entirety.

FIELD OF THE INVENTION

The invention relates to the field of leak detection in automotive and industrial applications.

BACKGROUND OF THE INVENTION

New water-based coolants have recently been introduced into the automotive industry. These coolants have superior service lives and work better than older coolants with new materials currently being used in radiators. The new coolants are colored distinctly differently from the traditional bright green colored coolants previously available. Due to the formulations of the new coolant, if a system containing a new coolant is inadvertently contaminated with the old, green coolants, the useful life of the coolant will be drastically reduced. As such, any mixture of new coolant and old coolant requires that the system be completely flushed to maximize efficiency.

In order to detect leaks in coolant systems, coolant dyes are added to the system that are designed to activate when exposed to UV or high energy blue visible light. An example of such a dye is the TP-3900 engine coolant dye sold by Spectronics Corporation, Westbury, N.Y. Such dyes are green fluorescing and heavily concentrated and, thus, impart visibly green color to coolant so as not to significantly affect or change the overall color of the coolant. These dyes are also designed to produce a green fluorescence when exposed to UV or high energy blue visible light.

When conventional leak detection dyes are used with new water-based coolants, the high concentration associated with their formulation can cause the impression that the coolant has been contaminated with the older, green coolant. If service personnel mistake the new coolant for old coolant based on its dye-imparted green color, the new coolant may be unnecessary flushed. As such, time, materials and money can be wasted as good coolant is changed and systems are needlessly flushed.

Blue water-based dyes are available for coolants but they present a different problem. The automotive service industry frequently uses blue-light lamps with blue absorbing yellow glasses to excite fluorescent dyes. When used with green water-based dyes, the blue light and yellow glasses permit the green fluorescence to be readily visibly detected. A blue water-based dye, however, when exposed to the blue light will produce a blue fluoresce. Since the conventional yellow colored viewing glasses tend to absorb blue light, the blue fluorescent response exhibited by the dye will not be detected by the user. If these glasses are not used, the blue light from the lamp will overwhelm the blue fluorescent response, thus preventing a user from detecting the fluorescence.

SUMMARY OF THE INVENTION

The present invention relates to a blended dye for coolant. In one embodiment of the invention, the blended dye includes a first water miscible dye adapted to fluoresce when illuminated with a light. The first dye preferably has a wavelength of about 340 nm to about 420 nm. The blended dye also includes a second water miscible dye adapted to fluoresce when illuminated with a light having a wavelength of about 400 nm to about 460 nm. The second dye has a different composition from the first dye.

In one configuration, the first and second dyes are selected from a group of dyes that include uranine, stylbene, and xanthene. The dyes are preferably designed to be added to a coolant. The dyes can be provided in many different forms, such as non-liquid (e.g., a dissolvable pill or a powder), or in a semi-liquid form.

In another embodiment of the invention the blended dye includes a substantially clear and colorless first dye, and at least one second dye that is more visibly colored than the first dye. The quantity of the second dye is small relative to the first dye. The blended dye is adapted to fluoresce visibly using standard leak detection inspection equipment while not affecting the body color of a coolant to which it is added.

The blended dyes can be used in a for detecting leaks in multiple circulation systems. Specifically, a plurality of blended dyes can be provided, each blended dye adapted to fluoresce when illuminated by light at a particular wavelength, the fluorescence of each dye being in a different color. The different blended dyes are added to distinct circulation systems.

In use, a light is selected for illuminating each individual circulation system with a specific wavelength that produces excitation of the dye within that circulation system.

Other objects, aspects and advantages of the present invention will become apparent to those skilled in the art upon reading the following detailed description, when considered in conjunction with the appended claims and the accompanying drawings briefly described below.

DESCRIPTION OF THE INVENTION

The present invention relates to a blend dye that can be used to treat new and old coolants for leak detection with UV lamps, blue light lamps and dichroic multi-spectrum lamps that are now used by service personnel. The blend dye is formulated to produce easily detectable fluorescence under any commonly used inspection lamp, while negligibly altering the color of the working fluid. Dyes are formulated to take advantage of their individual characteristics with the resulting product having the desired body color and fluorescent response.

In the case of automotive water-based coolants, new coolants can be orange or clear (sometimes appearing as light gold). Blends of uranine, stylbene, xanthene or other water miscible dyes can be used. Uranine has a very strong visible color as well as an excellent fluorescent response. It can be used in minute quantities in the blend dye to provide some fluorescent activity in the green color to make a dye's fluorescence visible with yellow spectacles. A blend dye can be formulated with uranine in which the uranine component negligibly affects the visual appearance of the water-based coolant. Thus, the visual orange or clear colors will not be greatly affected by the blend dye under visible light and will not be mistaken for old green coolant.

While the preferred embodiment of the invention is for use in coolant and similar heat transfer liquids, it is also contemplated that the blend dyes can be used in various capacities in the automotive service industry and in industrial applications. There are multiple fluids operating within any vehicle and in industrial plants, any of which can leak. It can be difficult to determine which system is leaking and to determine the origin of the leak, especially if more than one fluid leaks out at one time. This is particularly problematic if traces of the leaking fluids are mixing together as a result of gravity flow, air blowing or leak spraying. By providing specifically blended dyes for different fluid systems, this situation can be avoided.

U.S. Pat. No. 6,165,384 to Cooper et al. ("Cooper") which is incorporated herein by reference in its entirety, describes certain blends of dye for specific applications. By utilizing those blend ratios in one system and using the inverse blend ratio in another system, the systems will carry dyes with drastically different fluorescent properties. For example, a blend dye with a heavy perylene component and smaller naphthalimide content will fluoresce a strong yellow in color, while its inverse (heavy naphthalimide component and smaller perylene component) will fluoresce mostly in the green. Both blend dyes will have the benefits of being blended and will operate under light from most exciting lamps used in the field. Additionally, third, or even fourth dyes can be added to enhance the fluorescent responses and the absorption of the final blended dye products.

As an example, in the case of an aircraft, a leak from a hydraulic system may be difficult to distinguish over a leak from a lubricant line. A leak detection blend dye can be formulated for an aircraft hydraulic fluid with a ratio of perylene to naphthalimide of between about 4:1 and about 1.5:1. A blend dye can be formulated with an inverse ratio of perylene to naphthalimide, such as in the range of about 1:4 to about 1:1.5. Thus, if a yellow fluorescence is observed upon inspection of a leak, it can be determined that the leak has originated from the hydraulic system. At the same time, leaks from either source can be detected using a variety of inspection lamps. The idea holds in the case of automobiles, ships and industrial applications, where inverse ratio dyes can be used in other fluid systems where the source of leaks can be difficult to distinguish. The systems can include lubricants, transmission fluids, refrigerants, and the other systems noted in Cooper.

An example of a useful blended dye would be one designed to be used in a colorless automotive coolant. This dye could be a blend of a stilbene based dye and a xanthene based dye. The dye would be blended very heavily with the stilbene as many are virtually clear and colorless. However, they fluoresce blue which makes them virtually unresponsive with lamps other than a true ultraviolet lamp. The addition of a small proportion of a xanthene dye would counteract this problem. A very small percentage of xanthene, for example, as little as about 0.1%, could be used to shift the fluorescent response of the dye slightly towards the green and result in a product that is usable with all lamps—ultraviolet, blue and dual-spectrum lamps. The actual quantity of xanthene would depend on the acceptability of a small change in the body color of the targeted fluid. A blend dye used in a crystal-clear fluid would require only a minimal amount of xanthene while a darker fluid could tolerate more. These dyes are still sufficiently concentrated to be usable in convenient service dosages such as ¼-ounce or 1-ounce quantities.

In the case of water-based systems, inverse blends of uranine, stylbene, xanthene, or other water miscible dyes can be used. A blend having a large amount of a first of these dyes and a smaller amount of a second of these dyes can be used in a water-based coolant. The inverse blend, which has a large amount of the second component and a smaller amount of the first component can be used in a second water-based system, which can be a second coolant, a heat transfer fluid or other circulating water-based fluid. The blends in the respective systems will exhibit fluorescent responses that can be detected when excited with most commonly used detection lamps, yet can be easily differentiated from one another. Service personnel can therefore determine the origin of a leak by observing the fluorescence.

The dye can be incorporated into the heat transfer system in any many different configurations, preferably semi-liquid or non-liquid. The non-liquid is preferred since it is anticipated that the dye would be added to a heat transfer system during manufacture of the assembly (e.g., along an assembly line.) As such, it is preferable that the dye not be provided in a form that might lead to spilling. If the dye formulation does not have a high degree of cohesion, and thus cannot hold its shape for long, the dye can be supplied as a powder that can be supplied in tubes, capsules, bottles or small disposable cylinders. Alternately, the dye powder can be encapsulated in a shell or coating that is designed to dissolve when exposed to the fluid being treated. For example, the powder could be encapsulated in a water soluble capsule. Such capsules are well known.

Dye formulations that are more cohesive can be pelletized and supplied as pills or tablets sized for a specific volume of the heat transfer fluid. The tablets/pills can simply be dropped into the system being tested. The tablets/pills can be separately packaged, such as in blister packaging, or can be bottled. It is contemplated that an inert binder would be used to form the pill, and which permits use of fine powdered dyes.

It is also contemplated that the powders can be formed into a desired shape, such as through the use of controlled heat and pressure to sinter the material into shapes that are permeable by the liquid being tested. This permits maximization of the surface area, thus allowing dissolving of the dye pill/tablet in a minimum amount of time.

In addition to the dye itself, the dye blend may include additional soluble or non-soluble agents that provide further benefits to the heat transfer system. For example, anti-oxidants, pH buffers, anti-wear materials, and anti-corrosive materials may be incorporated into the dye blend.

In one preferred embodiment of the invention, the heat transfer system is an automotive coolant system. The semi-liquid or non-liquid dye blend can be added into the radiator when it is assembled. The dye blend would remain in its non-fluid state until the radiator is installed in a vehicle and coolant is added. The dye would then be released and circulate with the coolant through the system. The system could then be checked for leaks. Alternatively, the dye blend could be added to the radiator after it is installed in the vehicle.

The present invention may be embodied in other specific forms without departing from the spirit or essential attributes thereof and, accordingly, reference should be made to the appended claims, rather than to the foregoing specification, as indicating the scope of the invention.

The invention claimed is:

1. A process for detecting leaks in multiple circulation systems comprising the steps of:
   providing an apparatus having a plurality of circulation systems, each system circulating a specific fluid;
   providing a plurality of blended dyes, each blended dye adapted to fluoresce when illuminated by light at a particular wavelength, the fluorescence of each dye being in a different color;
   incorporating into each circulation system one of the plurality of blended dyes;
   illuminating at least a portion of each circulation system with a light within the particular wavelength that produces excitation of the dye within the circulation system; and determining if any of the circulation systems are leaking by searching for the appearance of fluorescing material on portions of the circulation system.

2. A blended dye for coolant comprising:
a first water miscible dye adapted to fluoresce when illuminated with a light having a wavelength of about 340 nm to about 420 nm, and
a second water miscible dye adapted to fluoresce when illuminated with a light having a wavelength of about 400 nm to about 460 nm, the second dye being different from the first dye.

3. The blended dye of claim 2, wherein the first and second dyes are selected from a group of dyes consisting of uranine, stilbene, and xanthene.

4. The blended dye of claim 2 wherein the blended dye is in a solid form.

5. The blended dye of claim 4 wherein the blended dye is in the form of a dissolvable tablet.

6. The blended dye of claim 4 wherein the blended dye is in the form of a powder.

7. The blended dye of claim 2 wherein the blended dye is in the form of a gel.

8. A blended dye for use with a coolant, the blend dye comprising a substantially clear and colorless water miscible first dye; and at least one second water miscible dye that is more visibly colored than the first dye, the percent quantity of the second water miscible dye relative to the first being small, the blend dye adapted to fluoresce visibly using standard leak detection inspection equipment while not affecting the body color of a coolant to which it is added.

9. The blended dye of claim 8 wherein the first and second dyes are selected from a group of dyes consisting of uranine, stilbene, and xanthene.

10. The blended dye of claim 8 wherein the blended dye is in a solid form.

11. The blended dye of claim 10 wherein the blended dye is in the form of a dissolvable tablet.

12. The blended dye of claim 10 wherein the blended dye is in the form of a powder.

13. The blended dye of claim 8 wherein the blended dye is in the form of a gel.

* * * * *